(12) United States Patent
Ikeno

(10) Patent No.: US 7,362,479 B2
(45) Date of Patent: Apr. 22, 2008

(54) IMAGE READING APPARATUS

(75) Inventor: Takahiro Ikeno, Owariasahi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1022 days.

(21) Appl. No.: 10/614,124

(22) Filed: Jul. 8, 2003

(65) Prior Publication Data

US 2004/0008387 A1 Jan. 15, 2004

(30) Foreign Application Priority Data

Jul. 9, 2002 (JP) ............................. 2002-200072

(51) Int. Cl.
*H04N 1/04* (2006.01)

(52) U.S. Cl. ...................... 358/482; 358/483; 358/443; 358/445; 358/450

(58) Field of Classification Search ................ 358/482, 358/483, 486, 474, 497, 505, 506, 487, 512–514, 358/445, 443, 450; 250/208.1, 234–236, 250/216; 382/312, 299; 348/294, 298, 272, 348/276, 322, 323
See application file for complete search history.

(56) References Cited

U.S. PATENT DOCUMENTS

| | | | | |
|---|---|---|---|---|
| 5,767,901 | A * | 6/1998 | Kimura | 348/272 |
| 2004/0012829 | A1* | 1/2004 | Takahashi | 358/474 |
| 2004/0047006 | A1* | 3/2004 | Kato | 358/474 |
| 2005/0078339 | A1* | 4/2005 | Hori | 358/445 |

* cited by examiner

*Primary Examiner*—Cheukfan Lee
(74) *Attorney, Agent, or Firm*—Oliff & Berridge, PLC

(57) ABSTRACT

The scanner comprises first and second sensors 21, 22 wherein light receiving elements with 600 dpi resolution are arranged, a first shift register 25 which outputs all the pixel signals received from light receiving elements in the first sensor 21, and a second shift register 26 which outputs pixel signals received from even numbered light receiving elements in the second sensor 22, and selectively executes quality oriented image reading with 300 dpi resolution by utilizing one pixel signal composed of added pixel signals received from two light receiving elements arranged next to each other, or speed oriented image reading with 300 dpi resolution by utilizing pixel signals received from the second shift register.

14 Claims, 6 Drawing Sheets

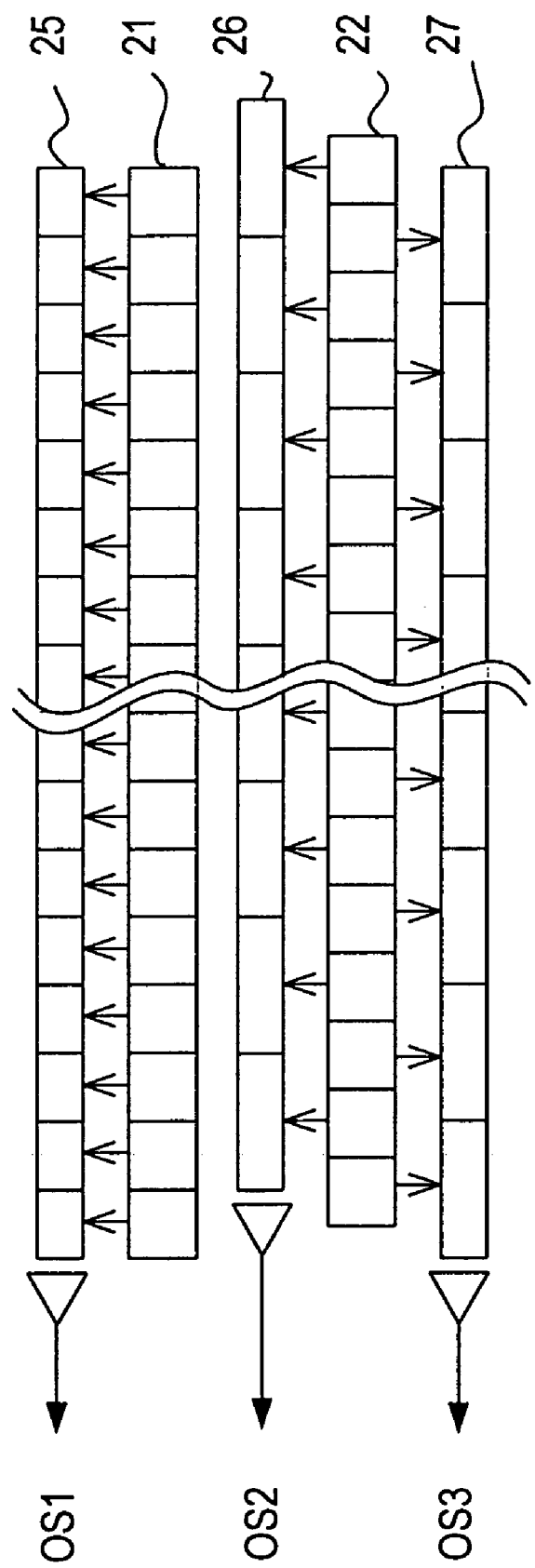

IMAGE READING APPARATUS

BACKGROUND OF THE INVENTION (1) Field of the Invention

This invention relates to image reading apparatuses, which read images on an original copy as an electric data using image sensors comprising light receiving elements one-dimensionally arranged, such as scanners, faxes, copiers and complex machines of these.

(2) Background Art

Image reading apparatuses which read images on the original copy as electric data using image sensors comprising light receiving elements one-dimensionally arranged are already known as scanners, faxes, copiers and complex machines of these.

There are various ways how to read desired image data. The selection of the way to be used depends on the use of the read image or conditions at the reading process. In some cases, high precision is required for photo images despite of increase in the data volume. In other cases the data volume of the read image needs to be reduced for a data transmission by FAX rather than keeping the precision. Sometimes both of the precision and the data volume should modestly be maintained.

Conventional apparatuses can change precisions and data volumes by outputting the data of read image with the resolution increased or decreased in accordance with the data in use.

In case of having a text image read using an OCR (Optical Character Reader), certain degree of resolution is necessary for OCR recognition, but the dynamic range can be low because the image signals will be digitalized by determining the signal level with a threshold. The reading time should be more concerned and should be shorter. Often the number of pages to go through the reading process is large. In this kind of case, the priority should be given to the speed of image reading.

In another case, a resolution is inevitably set low because of the limit to a data volume of, for instance, a photo image though reproduction of the image is required as much as possible. In this case, the priority should be given to the image quality.

However, none of image reading apparatus has been able to read images at the same resolution with some changes in conditions, such as reading speed, depending on the situation. The image data for OCR mentioned above outputs the data read by image sensors after digitalizing it. The output is still done through image sensors, and the reading time is not significantly different in comparison with reading images with a gradation.

As described above, known image reading apparatuses do not fulfill demands of users who sometimes need quality oriented image reading and other times speed oriented image reading with the same condition of the resolution.

The present invention is to concern these matters, and its object is to provide an image reading apparatus which is capable of choosing a reading manner from a quality oriented image reading and a speed oriented image reading, even when the images have the same condition of resolution.

SUMMARY OF THE INVENTION

To attain this and other objects, the image reading apparatus comprises a first sensor which is composed of light receiving elements arranged in a main scanning direction, a second sensor which is composed of light receiving elements and is arranged in a sub scanning direction with predetermined intervals, a first output unit which outputs pixel signals received from each light receiving element of the first sensor in the arrangement order of the light receiving elements, a second output unit which outputs pixel signals received from even-numbered light receiving elements in the arrangement of the second sensor into the arrangement order, and a third output unit which outputs pixel signals received from odd-numbered light receiving elements in the arrangement of the second sensor into the arrangement order, and reads images of original copies using the sensors.

The image reading apparatus of this invention further comprises a first reading unit which adds up the pixel signals sequentially output into consecutive pixel units and outputs the added pixel signals, a second reading unit which outputs pixel signals sequentially output from the second output unit or the third output unit as pixel signals, and a mode selection unit which operates the first reading unit when it is externally given a command for quality oriented reading mode as a part of an operation mode of the image reading apparatus, and operates the second reading unit when it is given a command for speed oriented reading mode.

More specifically, the image reading apparatus of the present invention comprises two sensors, a first output unit which outputs all the pixel signals from one of the sensors, a second and third output unit which output even-numbered and odd-numbered pixels from the other sensor. The apparatus further comprises a first reading unit which adds up pixel signals received from light receiving elements and makes them into apparent one pixel signal, and reduces the number of pixel signals to be output, thus achieves an output with half of the resolution to be originally achieved, and a second reading unit which accomplishes an output with half of the resolution to be originally achieved. The image reading apparatus can select a reading unit from the two described above, and can execute the selected unit.

The first reading unit is suitable for quality oriented image reading because of its character of having increased sensitivity. The sensitivity is increased since the information from a plurality of light receiving elements is included in one pixel signal. The increased sensitivity can improve conserving thin lines of images, but at the same time it slows down the speed of pixel signals output from an output unit. The second reading unit, on the other hand, is suitable for speed oriented image reading. It can shorten the reading time of images because it uses only the half of the pixel signals received from light receiving elements and takes shorter time to output the signals from an output unit. However, the information of pixel signals from light receiving elements is culled; it lowers the quality of an output image.

Consequently, the image reading apparatus of the present invention enables to select either of the first reading unit wherein image qualities prevail or the second reading unit wherein the reading speed precedes.

This kind of image reading apparatus is more convenient for users in the way that they can select a reading unit depending on conditions at image reading process.

In the meanwhile, the addition in a first reading unit can be done anywhere and in anyway from where light receiving elements are placed to where signals are output. An addition unit can be set up outside of an output unit, for example, or an addition can be done within an output unit.

In case of a general CCD linear image sensor wherein accumulated electric charge depending on light volume of light receiving elements, is transferred to a shift register and is output electric charge within a shit register accumulates on an output terminal as it gets transferred to an output side by a transfer clock. This situation resembles to the one after pixel signals are added. A reset signal commands to eliminate the accumulated electric charge before more charge from next pixel signals is sent. This elimination keeps the amount of the electric charge on the output terminal as much as the amount sent by one pixel signal. Hence, if the timing of reset signal is set in double cycle, for example, the amount of two pixel signals is output on output terminals of an output unit.

Image reading apparatuses with CCD linear image sensors mentioned above can easily add pixel signals.

The image reading apparatus is preferably designed so that the first output unit is synchronized with the transfer clock which is externally input, and transfers pixel signals received from each light receiving element of the first sensor to the adding unit in the arrangement order of the light receiving elements, then as well as outputting the pixel signals added by the adding unit, it eliminates the added signals with the reset signal which is synchronized with the transfer clock and is externally input. The first reading unit sets the cycle of the reset signal which is input into the first output unit in integral multiple of the transfer clock. This enables to output pixel signals which are composed of addition for sequential pixel units, and output the pixel signals from the first output unit as pixel signals corresponding to read images.

According to the above-mentioned image reading apparatus, it is thereby possible to output added pixel signals from the first output unit only by changing the cycle of reset signals of the first output unit. Without having a new accumulator or of the kind, it enables add pixel signals easily.

As an image reading apparatus is being used, light volume gets reduced because of deterioration of a light source or interruption of extraneous objects. In such cases, the contrast of an original image weakens and the image becomes unclear. It reduces the information volume of image signals.

Moreover, when an image reading apparatus reads an image that contains information with the resolution limit, for example a thin line, with using the second reading unit, more image information tends to be missed since there is no pixel information from skipped light receiving elements. This causes distinction problems. In case a text image contains thin vertical lines, these vertical lines are not recognized in the reading process, and the letters become hard to distinguish without vertical lines.

Corresponding to this matter, the above-mentioned image reading apparatus preferably has a standard image for brightness determination for each sensor. The standard image is placed where sensors can read images. A standard image reading unit obtains pixel signals corresponding to the standard image by using any of the first, second or third output unit.

After the speed oriented reading mode is set for the operation mode, the mode selection unit compares the evaluation value of brightness determination which is obtained by calculations based on pixel signals read by the standard image reading unit and the standard value of the determination. If the evaluation value indicates that it is darker than the standard value, the mode selection unit operates the slow reading unit.

According to the above-mentioned image reading apparatus, the first reading unit is selected to be operated when the brightness of a light source decreases even the speed oriented reading mode is already specified. In the first reading unit, loss of image information hardly occurs. Problems caused by loss or breakage of image information seldom take places and on this account, it is possible to prevent problems attributed to reduction of image information.

Reading with the second reading unit, on the other hand, shortens the transfer time of pixel data because the number of pixel signals by an output unit is less than that of the first reading unit.

With an image reading apparatus that changes the relative position of the sensors and the original copy, and sub scans perpendicular to the arrange direction of the sensors in order to read two dimensional images, the second reading unit can start image reading on the next line faster than the first reading unit; this can increase the movement speed of sub scanning direction.

In the above-mentioned image reading apparatus, a sub scanning unit changes the relative position of each sensor and the original copy to sub scanning direction at certain movement speed externally set, and a mode selection unit sets the movement speed of relative position changed by the sub scanning unit depending on the time necessary for a reading unit, which is operated corresponding to an operation mode of the device, to output pixel signals for one scanning According to the above-mentioned image reading apparatus, when a mode, e.g. the second reading unit, is selected wherein pixel signals are read fast, the movement speed of a sub scanning unit can be changed corresponding to the reading speed. The reading time for a whole image, as a result, becomes shorter.

The first and second reading unit read pixel signals at lower resolution than the one set by the light receiving elements held in the first and second sensors. It is also possible to output pixel signals at the highest achievable resolution of the light receiving elements in one sensor.

In the image reading apparatus mentioned above, the pixel density of the first sensor in the main scanning direction and the pixel density of the second sensor in the main scanning direction are preferably the same.

The above-mentioned image reading apparatus is preferably provided the third reading unit to output pixel signals output by the first output unit or said second and third output unit as pixel data corresponding to read images, and the mode selection unit operates the third reading unit when a command for a fine reading mode is externally sent as an operation mode of the image reading apparatus.

According to the image reading apparatus of the present invention, it is possible to output pixel signals of images at the highest achievable resolution in one sensor. This widens the scope of choices in the reading process, and makes the image reading apparatus more convenient.

The resolution with one sensor is determined by the number of light receiving elements in the sensor per unit length. If the position, being along with the main scanning direction, of each light receiving element constituting one of the two sensors is placed between light receiving elements constituting the other sensor, signals of the same image read by two sensors can be combined and can be dealt as an image with double resolution.

In the above-mentioned image reading apparatus, the second sensor is preferably placed its position which is along with the main scanning direction of light receiving elements constituting the second sensor between each light receiving elements constituting the first sensor so that light receiving elements from both sensors are placed alternately. Furthermore, the fourth reading unit outputs pixel signals sequentially output from the first, the second and the third output units as pixel signals, and the mode selection unit operates the fourth reading unit by a command for super fine reading mode externally sent as the operation mode of the image reading apparatus.

According to the above-mentioned image reading apparatus, it is possible to output pixel signals of an image at the resolution double to the one attained by light receiving elements of each sensors.

This enables to output pixel signals of an image with double resolution without changing the size of light receiving elements. It, in addition, widens the scope of choices for reading process.

The above-mentioned reading apparatus may further comprise a fifth reading unit outputs pixel signals sequentially output from the first output unit as pixel signals, and a sixth reading unit outputs pixel signals sequentially output from the second and third output unit as pixel signals. The mode selection unit, in this image reading apparatus, selectively operates fifth or sixth reading units when the reading resolution specified by an external command is equivalent to the pixel density of the first and second sensor.

BRIEF DESCRIPTION OF THE DRAWINGS

The invention will now be described below, by way of example, with reference to the accompanying drawings.

FIG. 3 is an explanatory view to show the structure of the CCD linear image sensor of the embodiment;

DETAILED DESCRIPTION OF THE PREFERRED EMBODIMENT

Figure 1:
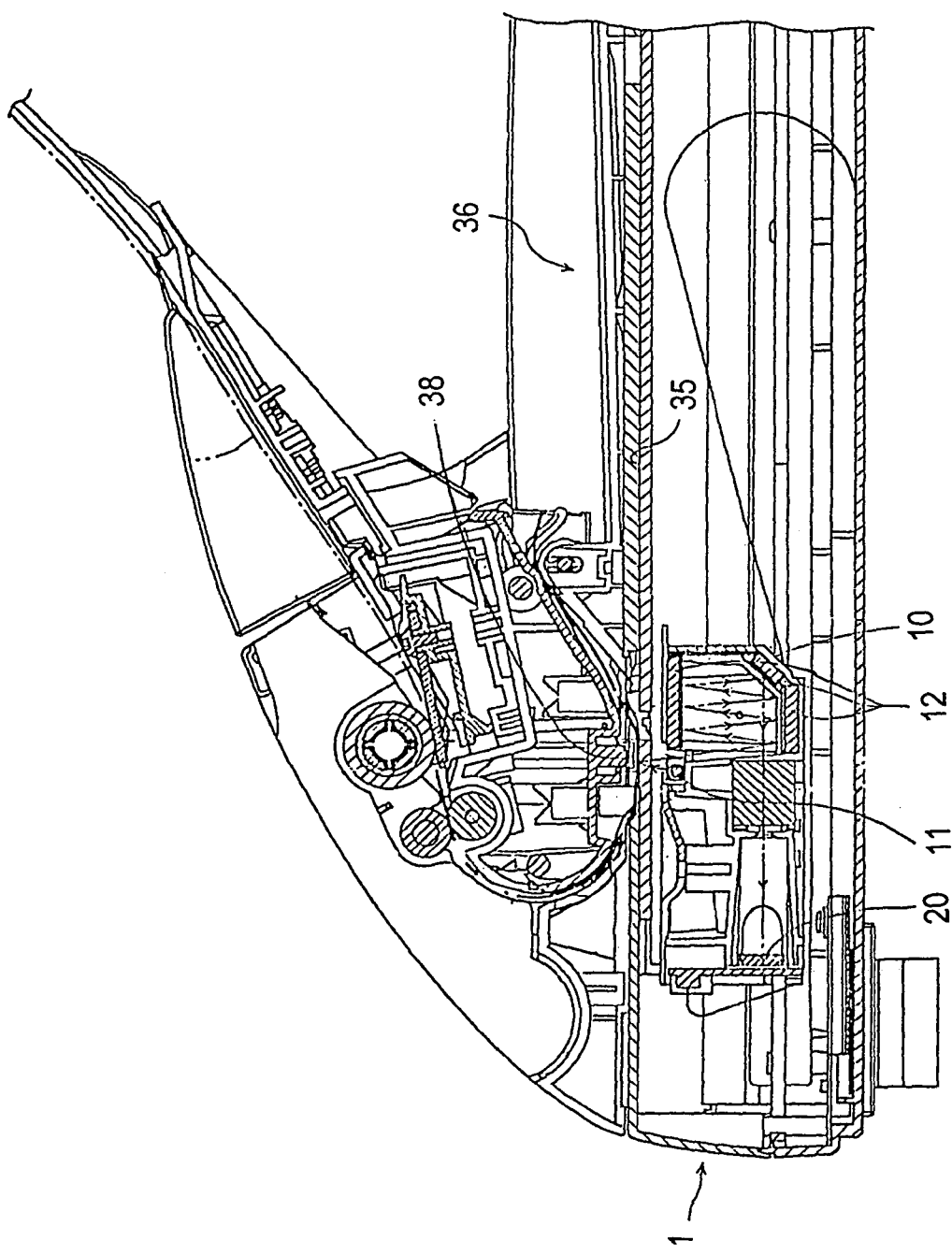
FIG. 1 is a partial section view to show the structure of the scanner of the embodiment according to the present invention.
Figure 2:
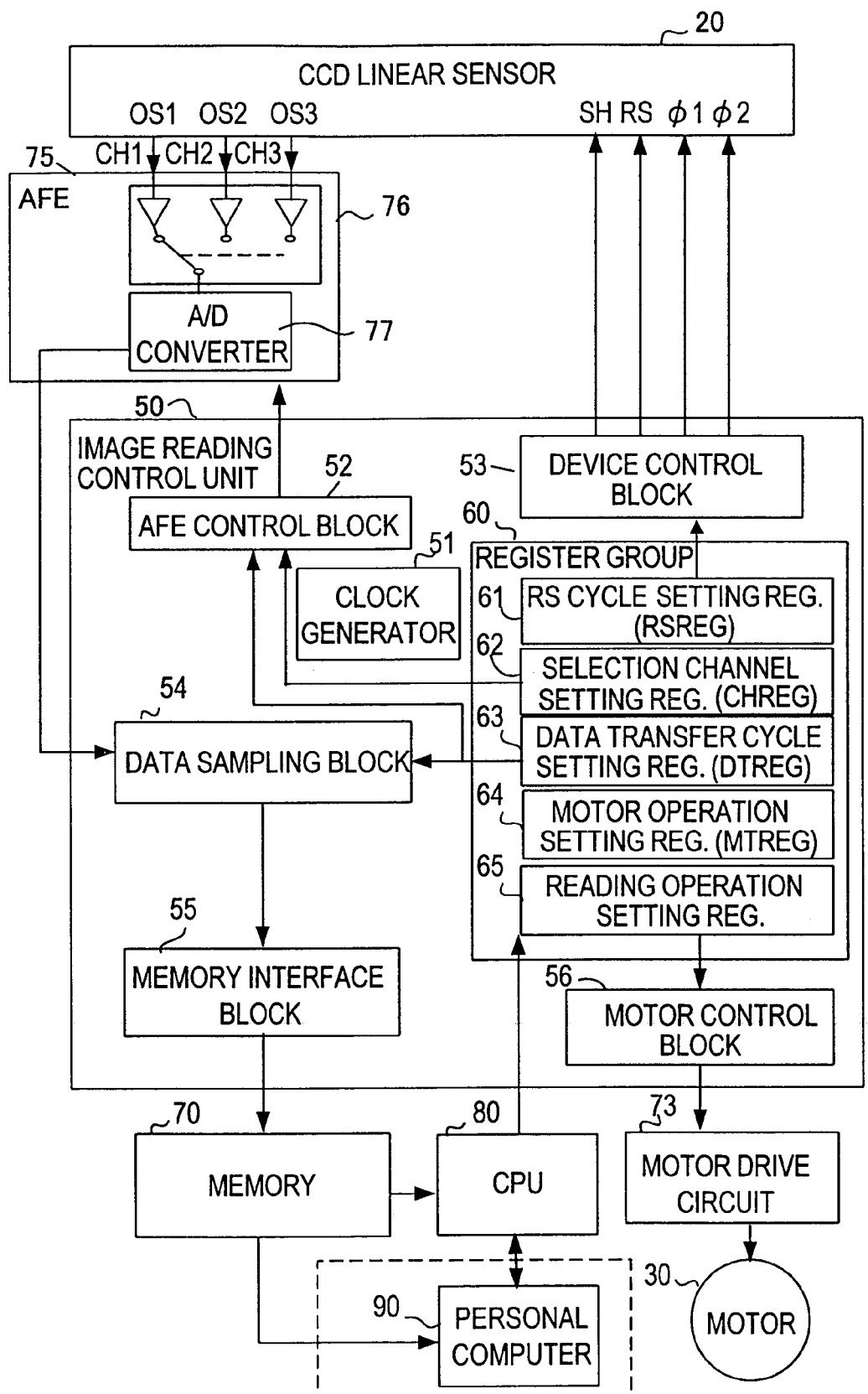
FIG. 2 is a block diagram to show the electrical structure of the embodiment.

Referring to FIG. 1, a flat-bed scanner 1 of the present embodiment receives a command for initiating reading from an external personal computer (referred as a PC in below) 90, reads a monochrome (black) image of an original copy placed on a reading surface with a CCD (Charge Coupled Diode) linear image sensor (referred as a CCD sensor in below) 20, and records read pixel signals in memory 70 as pixel data in the form of digitalized signals.

As shown in FIG. 1, the scanner 1 comprises an imaging unit 10 having a lamp 11, a mirror 12 and a CCD linear sensor 20, a glass 35 as a reading surface for the original copy, a holding cover 36 to hold the original copy and a white board 38 for acquiring standard signals for data correction.

The imaging unit 10 incidents reflection of the light emitted on the original copy by the lamp 11 into the CCD sensor 20 after reflecting it several times with the mirror 12, and then, outputs pixel signals corresponding to incident light, i.e. pixel signals from the CCD sensor 20. The imaging unit 10 has a drive source to sub-scan the original copy placed on the glass 35.

The CCD sensor 20, as shown in FIG. 3, comprises a first sensor 21, a second sensor 22, a first shift register 25, a second shift register 26 and a third shift register 27.

In the first sensor 21, light receiving elements which accumulate electric charges corresponding to the amount of the received light are one-dimensionally arranged. The length of the arrangement is equivalent to the width of the image reading range to be read in the scanner, and its density is as high as that for 600 dpi (dot per inch) resolutions. The second sensor 22 has the same arrangement of light receiving elements as the first sensor 21. The respective light receiving elements constituting the second sensor are placed predetermined number of lines (e.g. 6 lines) away from the first sensor 21 in the sub-scanning direction, and shifted by a half of pixel with respect to the light receiving elements constituting the first sensor 21 in the main scanning direction.

The first shift register 25 receives all the electric charges accumulated in the respective light receiving elements in the first sensor 21 and transfers the respective electric charges to an output terminal OS1, and sequentially outputs voltage signals relative to the electric charges from the output terminal OS1 as pixel signals. The second shift register 26 respectively receives electric charges from even-numbered light receiving elements in the second sensor 22, and sequentially outputs voltage signals to an output terminal OS2 in the same manner as first shift register 25. The third shift register 27 respectively receives electric charges from odd-numbered light receiving elements in the second sensor 22 and sequentially outputs in the same manner as first shift register 25 to the output terminal OS3.

Furthermore, the scanner 1 comprises a CPU 80 to control the entire operations of the scanner 1, an AFE (Analog Front End) 75 to convert the signals from one of three channels (CH1, CH2, CH3) of the CCD sensor 20 into digital signals, an image reading control unit 50 to control operations of the CCD sensor 20 and the AFE 75, a motor 30 for a drive source to move the imaging unit 10, and a motor drive circuit 73 to provide drive commands to the motor 30 in response to a command from the image reading control unit 50.

The AFE 75 comprises a selector 76 to receive output signals from three channels of the CCD sensor 20, to select and switch one or more channels with predetermined switching cycle, and output signals, and an A/D converter 77 to convert analog signals received from the selector 76 into digital signals. The selector 76 has three amplifiers each can work for respective channel. The respective amplifier latches input signals with predetermined cycle, multiplies latched signals by predetermined gain, and is able to add offset signals. It is possible to set the selector 76 by providing external commands for selecting signals, switching cycles, latching cycles by amplifiers, and values of gains and offsets to be set.

The motor 30 is composed of, for example, a step motor, and rotates with rotational amount and speed corresponding to drive commands sent by the motor drive circuit 73.

The image reading control unit 50 is composed of what is called ASIC (Application Specific Integrated Circuit). The image reading control unit 50 comprises a clock generator 51 to generate a clock signal which is a base for timing signals generated in the after-mentioned blocks and a standard for synchronizing in the image reading control unit 50, and an AFE control block 52 to control the operation of the AFE 75, a device control block 53 to control the driving of the CCD sensor 20, a data sampling block 54 which has FIFO (First In First Out) memory, samples pixel data from AFE, and records sampled data in the FIFO memory, a memory interface block 55 to read out pixel data from the data sampling block 54 and to write the read-out data into the memory 70, furthermore to read out pixel data from the memory 70 and to output the read-out data to the PC, a motor control block 56 to provide commands for operation conditions of motor 30 to the motor drive circuit 73, and a register group 60 to store preset values for operation conditions in each block of the image reading control unit 50.

The register group 60 comprises a RS cycle setting register 61 which stores multiplier factor for the standard cycle in order to set the length of the cycle of reset signals RS output by the device control block 53, a selection channel setting register 62 to store which channel(s) of the CCD sensor 20 to be selected, a data transfer cycle setting register 63 to store multiplier factor to the standard cycle of the timing to read out pixel data from the AFE 75 and the data sampling block 54, a motor operation setting register 64 to store conditions such as the travel time of the imaging unit 10 per line, the resolution of read-out image and the travel distance of the imaging unit 10, and a reading operation setting register 65 to activate each block of the image reading control unit 50.

All the blocks of the image reading control unit 50, except for the motor control block 56, start operating when a command for reading initiation is provided from the CPU 80 into reading the operation setting register 65, and stop operating when a command for reading stop is provided from the CPU 80 into the reading operation setting register 65.

The device control block 53 provides shift gate signals SH which are periodic pulse signals determined by data of the travel time in the motor operation setting register 64, the transfer clock signals $\phi 1$ and $\phi 2$ which are two rectangle waves 180° differed to each other in their phases, and reset signals RS which are periodic pulse signals determined by the value obtained by multiplying the multiplier factor set in the RS cycle setting register 61 by the value of the standard cycle, i.e. the transfer clock signals $\phi 1$ and $\phi 2$.

The AFE control block 52 instructs the selector 76 to choose a channel or channels of the CCD sensor 20 using the setting data in the selection channel setting register 62, and also sets the length of the cycle for switching channels which is selected by the selector 76. The cycle length is calculated by multiplying the cycle length of the transfer clock signals $\phi 1$ and $\phi 2$ by the set value of the data transfer cycle setting register 63. The AFE control block 52 furthermore calculates the gain of the amplifiers in the selector 76 by dividing the value of the predetermined basic gain by the value of the RS cycle setting register 61 and the value of the travel time of motor operation setting register 64 and sets the calculated value or a value multiplying the calculated value by a constant value to the selector 76.

The data sampling block 54 sets the length of the cycle for sampling pixel data from the AFE 75 by multiplying the cycle length of the transfer clock signals $\phi 1$ and $\phi 2$ by the value of the data transfer cycle setting register 63.

The motor control block 56 controls the motor 30 through the motor drive circuit 73 so that the imaging unit 10 moves in the travel time and for travel distance set in the motor operation setting register 64 at the travel speed determined by the resolution. The motor control block 56 has a counter internally installed. The counter counts the number of driving steps of the motor 30. When the number of the counter goes up to the number which corresponds to the travel distance set in the motor operation setting register 64, the motor control block 56 provides a signal of travel completion to the CPU 80 to stop rotation of the motor 30.

In the motor operation setting register 64, there are two conditions for setting the travel time for the imaging unit 10 to travel on one line. One is "Normal" condition which is defined by the time necessary to output all the pixel signals from the first shift register 25. The other is "Fast" condition which is defined by the time necessary to output all the pixel signals from the second and third shift registers. The numbers of the pixel signals from the second and third shift registers are half of that from the first shift register; the setting time for "Fast" condition is shorter than for "Normal" condition.

Signals been output by the CCD sensor 20 is written in the memory 70 in the following order:

The CPU 80 writes a command for initiating reading into the reading operation setting register 65. This activates each block in the image reading control unit 50. Then the device control block 53 outputs shift gate signal SH, reset signals RS and the transfer clock signals $\phi 1$ and $\phi 2$ to the CCD sensor 20.

During the period of the first shift gate signal SH to the next shift gate signal, the light receiving elements receive reflection light from the original copy and accumulate electric charges. With the falling edge of the next shift gate signal, the accumulated electric charges in the first sensor 21 from each light receiving element move to the shift register 25. In the second sensor 22, accumulated electric charges from each light receiving element, likewise, move respectively to the second and third shift registers 26 and 27.

Figure 4A:
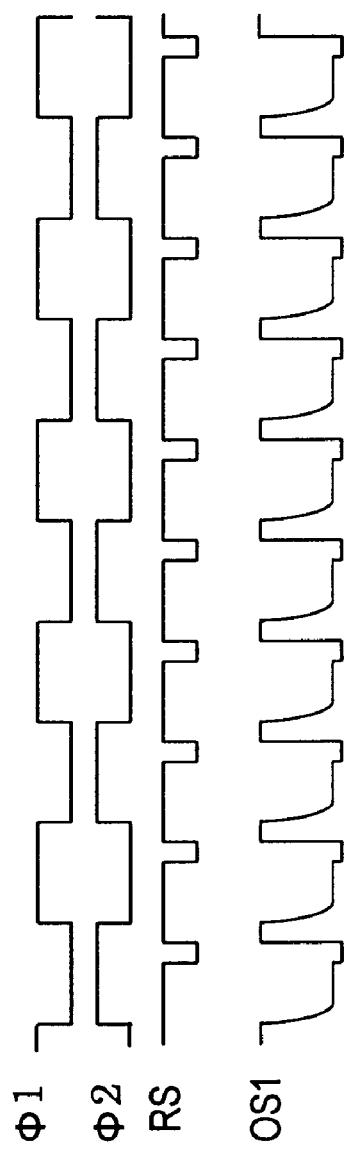
FIG. 4 is a timing chart showing status of signals in the CCD sensor of the embodiment.

As shown in FIG. 4A, output from the output terminal OS1 goes back to the standard voltage after electric charges are cleared on the output terminal OS1 of the first shift register 25 with a rising edge of reset signals RS. With edges of the transfer clock signals $\phi 1$ and $\phi 2$, the electric charges in the first shift register 25 are shifted toward the output terminal. Voltage on the output terminal side of the first shift register 25 corresponding to the electric charge is output from the output terminal OS1. More specifically, pixel signals subjected by the light receiving elements are output. The same outputs of pixel signals take places in the second and third shift registers.

After the output voltage is stabilized in the output terminal, until next reset signals come, the amplifiers of the selector 76 in the AFE 75 latch pixel signals from the output terminals OS1 to OS3. The AFE control block 52 conducts gain adjustment, and offset adjustment to the pixel signal output from the output terminals OS1 to OS3 in the AFE 75.

The electric charges from each sensor are shifted by each shift register. The performances up to the stage wherein the electric charges get buffered by the amplifiers of the selector 76, are repeated at every edge of the transfer clock signals $\phi 1$ and $\phi 2$.

The signals buffered by the amplifiers of the selector 76 is output into the A/D converter 77 through an output channel selected in the selector 76 by a command of the AFE control block 52. In case a plurality of output channels are selected, the selector 76 switches over the channels in the cycle set by the AFE control block 52, and then outputs the buffered signals as serial signals.

The signals output from the selector 76 are input to the A/D converter 77 in synchronization with the output cycle. The A/D converter 77 converts the input signals into pixel data in the form of digital signals, and outputs the pixel data.

The pixel data from the A/D converter 77 are sampled by the data sampling block 54 with the cycle set based on the value of data transfer cycle register 63. After the sampling, the data is written in the FIFO memory.

The pixel data written into the FIFO memory of the data sampling block 54 is taken out by memory interface block 55, and is written sequentially into the memory 70 by the memory interface block 55 in accordance with the status of in/output to/from the memory 70.

When the next shift gate signals SH are output, the CCD sensor 20 retransfers electric charges accumulated in the first and second sensors 21 and 22 to each shift register while outputting previous pixel signals. The operation from the stage wherein pixel signals are output from the CCD sensor 20 till the stage wherein pixel signals are stored in the memory 70 is repeated correspondingly.

The motor control block 56 provides a command to the motor drive circuit 73 to operate at the travel speed which is set by the value of the motor operation setting register 64 when an image reading is initiated. The motor control block 56 drives the motor 30, moves the imaging unit 10 toward the next line, and drives the motor 30 until the travel distance reaches to the value set by the motor operation setting register 64.

The image data written into the memory 70 is again read out by the memory interface block 55 in a predetermined timing, and is output to the external PC 90 with a predetermined device, e.g. a USB (Universal Serial Bus) controller.

There are four reading modes for image reading with the scanner 300 dpi (Normal) mode which is quality oriented at 300 dpi resolution, 300 dpi (Fast) mode which is speed oriented at 300 dpi resolution, 600 dpi mode at 600 dpi resolution and 1200 dpi mode at 1200 dpi resolution. The resolutions of the main scanning direction and sub direction are the same.

The 300 dpi (Normal) mode is a mode to acquire pixel data at 300 dpi wherein signals added with two pixel signals in the first shift register 25 are recorded in the memory as pixel data and are output.

For this mode, the CPU 80 sets "OS1" in the selection channel setting register 62, "2:1 (multiplier factor=2)" in the RS cycle setting register 61, "2:1 (multiplier factor=2)" in the data transfer cycle setting register 63, "Normal" for the travel time in the motor operation setting register 64 and "300" for the resolution.

Figure 4B:
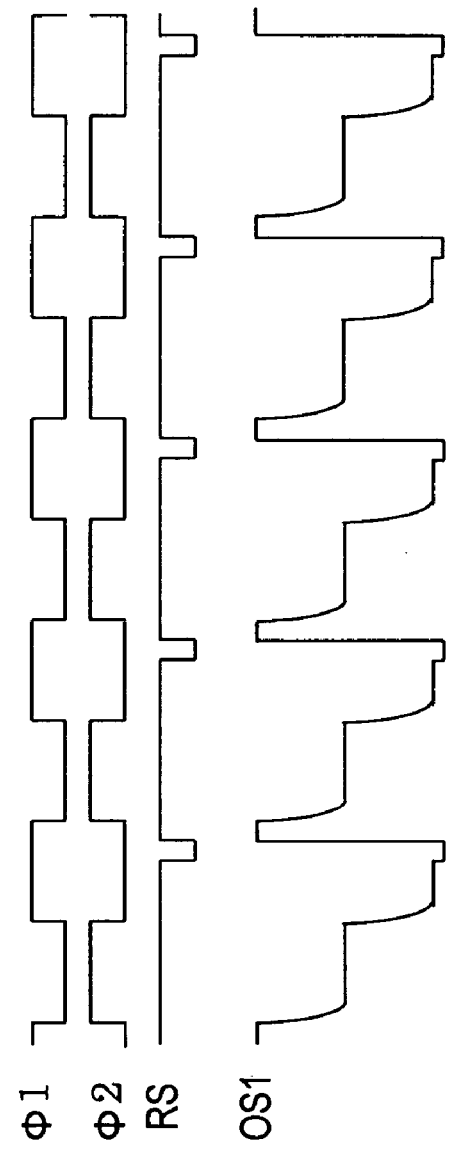

The transfer clock signals $\phi 1$ and $\phi 2$ in the device control block 53 remain the same, but the length of the cycle of reset signals RS becomes double. As shown in FIG. 4B, the conventional reset timings at every pixel signals, consequentially, do not work. More electric charges of the next pixel signal accumulate on the output terminal, voltage corresponding to the amount of two pixel signals are output. The output with added pixel signals is provided through the output terminal OS1. The selector 76 selects the output terminal OS1, and the pixel signals in the first shift register 25 are output. Responding to doubling the cycle length of reset signals RS, the cycle length for buffering with the amplifiers in the selector 76 and the cycle length for sampling in the data sampling block 54 become double. It makes the output level in the output terminal OS1 double, thus the gain of the amplifiers half. The cycle of shift gate signals SH is set as a standard cycle based on the time for the first shift register 25 to output pixel signals. The condition for the travel time of the first shift register 25 is set "Normal", and the traveling speed is as fast as for the imaging unit 10 to travel the distance under the travel time condition so that the resolution becomes 300 dpi, as the time for outputting signals in the amount of the first shift register 25 is required.

The 300 dpi (Fast) mode is a mode to record pixel signals received from even numbered light receiving elements of the second sensor 22 provided by the second shift register 26 into the memory as image data. It is to acquire pixel signals at 300 dpi, and faster in its reading in a sub scanning direction than in 300 dpi (Normal) mode.

For this mode, the CPU 80 sets "OS2" in the channel setting register, "1:1 (multiplier factor=1)" in the RS cycle setting register 61, "1:1 (multiplier factor=1)" in the data transfer cycle setting register 63, "Fast" for the traveling time in the motor operation setting register 64, and "300" for the resolution.

The selector 76 selects the output terminal OS2 and outputs pixel signals in the second shift register 26. The cycle of reset signals RS, that of output by the AFE 75 and that of input by the data sampling block 54 can remain the same; same as the cycle of transfer clock signals $\phi 1$ and $\phi 2$. The amount of output of pixel signals from the CCD sensor 20 can be as much as the amount only from the second shift register 26. The condition for the travel time of the imaging unit 10 is set "Fast", and the traveling speed is as fast as for the motor to travel the distance under the travel time condition so that the resolution becomes 300 dpi. The cycle of shift gate signals SH becomes half since the time for outputting pixel signals shortens. This also shortens the exposure time in the sensor; the gain of the amplifiers of the selector 76 becomes double.

In the present embodiment, "OS2" is set in the channel setting register, and the second shift register outputs pixel signals. Alternately, "OS3" can be set in the channel setting register to output pixel signals from the third shift register. In other words, either of the two channels "OS2", "OS3" can be set to output pixel signals when the 300 dpi (Fast) mode is selected.

The 600 dpi mode is a mode to acquire pixel data at 600 dpi wherein pixel signals from all the light receiving elements in the second sensor 22 are provided from the second and third shift registers 26 and 27, directly recorded in the memory as pixel data, and are output.

For this mode, the CPU 80 sets "OS2" and "OS3" in the channel setting register, "1:1 (multiplier factor=1)" in the RS cycle setting register 61, "1:2 (multiplier factor=½)" in the data transfer cycle setting register 63, "Fast" for the travel time in the motor operation setting register 64, and "600" for the resolution.

With this setting, the output terminal OS2 and OS3 are selected by selector 76 and pixel signals in the second and third shift registers 26 and 27 are output. The cycle of reset signals RS remains the same cycle as the respective cycle of transfer clock signals $\phi 1$ and $\phi 2$. The output cycle of the AFE 75 and the input cycle of the data sampling block 54 become one-half of the cycles of transfer clock signals $\phi 1$ and $\phi 2$, as the amount of input signals becomes as many signals as from two channels. The output pixel signals from the CCD sensor 20 is only as many signals as from the second and third shift registers 26 and 27. Therefore, the condition for the traveling time of the imaging unit 10 is set "Fast", and the traveling speed is as fast as for the imaging unit 10 to travel the distance under the travel time condition so that the resolution becomes 600 dpi. The cycle of shift gate signals SH becomes half since the time for outputting pixel signals shortens. This also shortens the exposure time in the sensor; the gain of the amplifiers of the selector 76 becomes double.

The 1200 dpi mode is a mode to directly output pixel signals received from the first to third shift registers as pixel data. The first and second sensors respectively have 600 dpi resolutions, are arranged 6 lines (pixels) away from each other in the sub scanning direction, and shifted by a half of pixel in the main scanning direction as described above. An Image data with 1200 dpi resolution is formed by making image data for one line with arranging alternately the pixel data obtained on the current line from the second sensor (pixel signals from the second and third shift registers) and the image data obtained on six lines behind the current line from the first sensor alternately in the memory.

For this mode, the CPU 80 sets "OS1", "OS2" and "OS3" in the channel setting register, "1:1 (multiplier factor=1)" in the RS cycle setting register 61, "1:3 (multiplier factor=⅓)" in the data transfer cycle setting register 63, "Normal" for the traveling time in the motor operation setting register 64, and "1200" for the resolution.

With this setting, the output terminal OS1, OS2 and OS3 are selected by the selector 76 and all the pixel signals in the first to third shift registers 25 to 27 are output. The cycle of reset signal RS remains the same cycle as the respective cycle of transfer clock signals φ1 and φ2. The output cycle of the AFE 75 and the input cycle of the data sampling block 54 become one-third of the cycle of transfer clock signals φ1 and φ2, as the amount of input signals becomes as many as signals as from three channels. The CCD sensor 20 needs to output pixel signals as many as it receives from the first shift register 25. The condition for the traveling time of the imaging unit 10 is set "Normal", and the traveling speed is as fast as for the imaging unit 10 to travel the distance under the travel time condition so that the resolution becomes 1200 dpi. The multiplier factor of the cycle of shift gate signals SH becomes 1 (one) since the time for outputting pixel signals remains normal length. This also retains the exposure time in the sensor; the gain of the amplifiers of the selector 76 becomes 1 (one).

Figure 5:
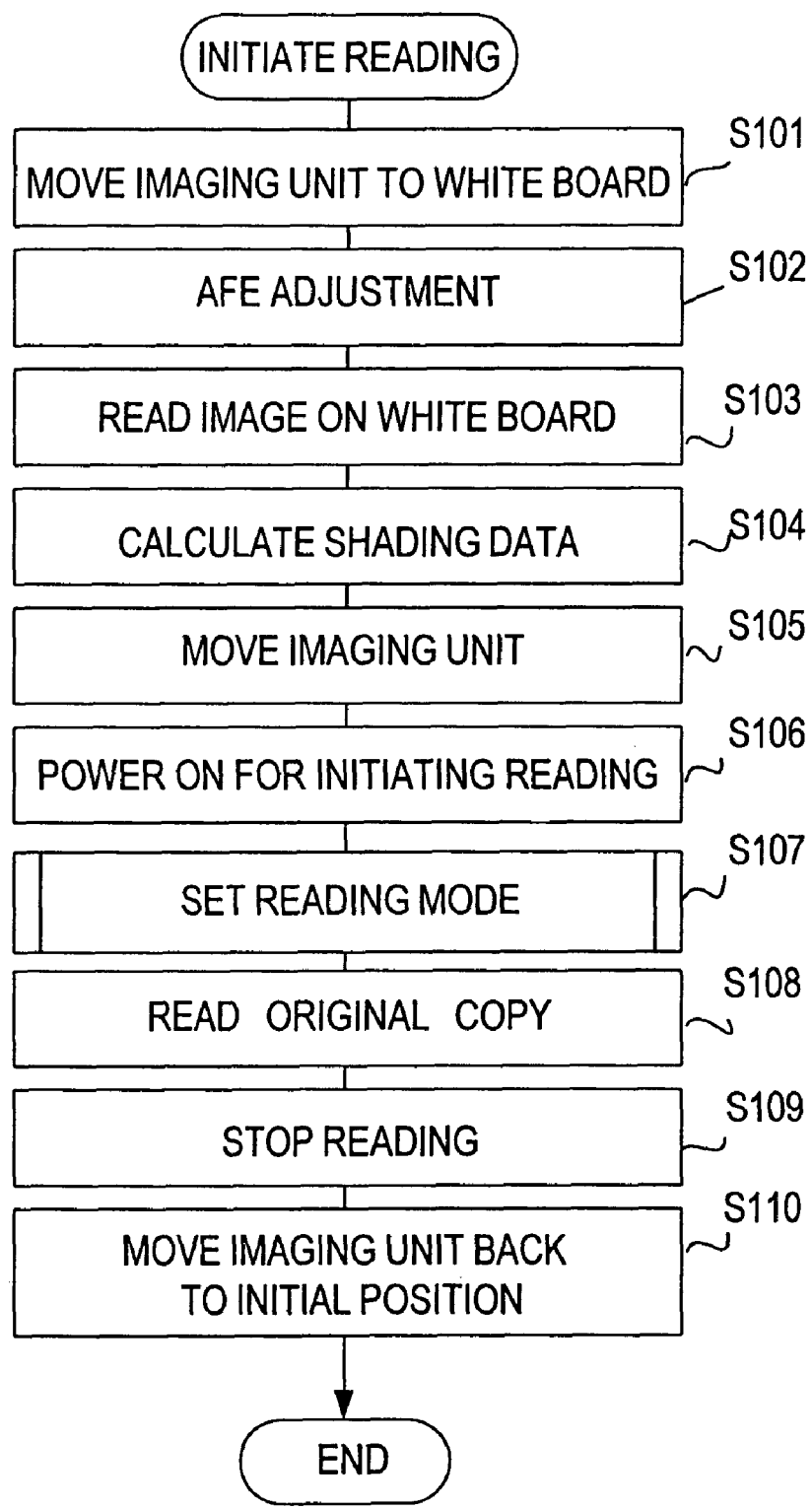
FIG. 5 is a flowchart showing the operation procedures of the CPU at image reading of the embodiment.

In accordance with the flow chart in FIG. 5, the operation procedure of the CPU80 which reads images with a command for initiating reading sent by the external PC 90 is going to be explained in below.

Meanwhile, the command for initiating reading includes information on designation of an image reading mode selected from one of those described above, and on reading coverage.

In S101, the travel distance and time which are as long as so that the imaging unit 10 can be moved to the position of the white board 38 are written in the motor operation setting register 64. When the motor control block 56 provides signals of travel completion, then the process proceeds to S102.

In S102, a command is provided to the AFE control block 52 to set the standard value for the gain of amplifiers and offset in the selector 76.

In S103, power is temporary applied to the image reading apparatus 50, the AFE 75 and the CCD sensor 20 in order to read the image on the white board 38. A command for initiating reading is provided to the reading operation setting register 65. The signals corresponding to the image on the white board 38 output by the CCD sensor 20 and contained in one line in each channel are stored in the memory 70 as pixel data.

In S104, the pixel data of the image of the white board 38 stored in the memory 70 at S103 is read out to calculate the shading data, based on predetermined calculation formula, for compensating uneven component caused by uneven light source or noise in light path. For the, evaluation value of brightness determination, the dynamic range is calculated with subtracting the value of black level from the value of white level in the pixel data mentioned above. In the meanwhile, there are some masked parts in the sensors 21 and 22 of the CCD sensor 20 to avoid light coming into the heads. The data of these masked parts are the black level output.

In S105, the travel time and distance are provided into the motor operation setting register 64 to move the imaging unit 10 to the initial reading position in front end of the original copy. When the motor control block 56 sends signals for travel completion, the process proceeds to S106.

In S106, power is applied to the image reading control 50, the AFE 75 and the CCD sensor 20 for initiating reading.

In S107, a reading mode is set in a setting order, which will be explained later, corresponding to the reading mode specified by the command for initiating reading.

In S108, a command for initiating operation is provided in the reading operation setting register 65 to initiate image reading. The travel distance corresponding to the reading coverage is provided to the motor operation setting register 64 by the command for initiating reading to move the imaging unit 10. When the motor control block 56 sends signals for travel completion, the process proceeds to S109.

In S109, a reading stop command is provided to the reading operation setting register 65 to stop the reading operation, and power to the image reading control unit 50, the AFE 75 and the CCD sensor 20 is shut off.

In S110, the travel distance and speed to move the imaging unit 10 back to its initial position are set in the motor operation setting register 64.

Figure 6:
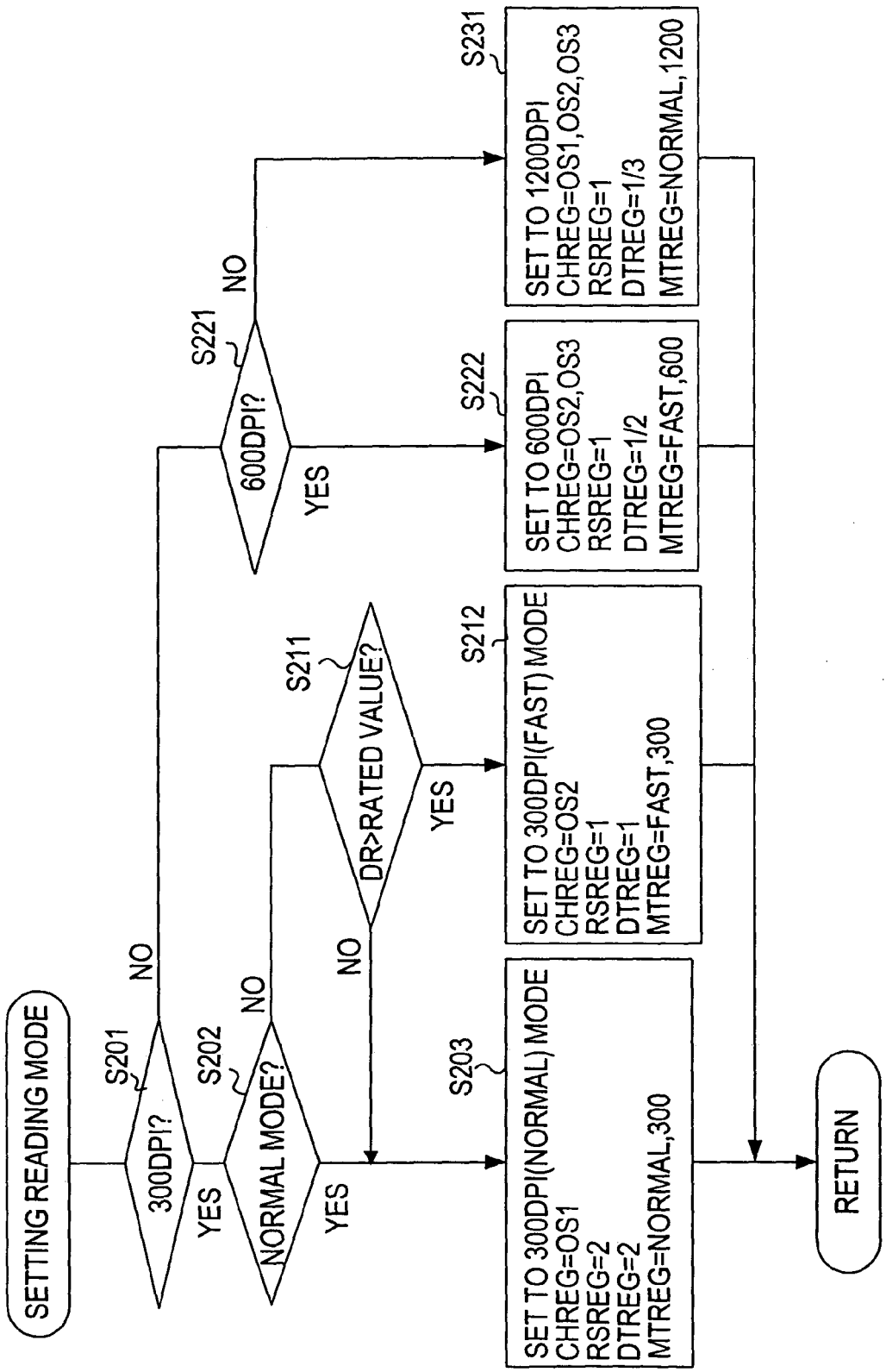
FIG. 6 is a flowchart showing operation procedures of reading mode setting in the CPU of the embodiment.

The followings are to explain the procedure for setting a reading mode in S107 with the flowchart in FIG. 6.

It is determined, in S201, whether the reading mode specified by the command for initiating reading is 300 dpi. If it is "300 dpi", the process proceeds to S202. If not, to S221.

In the next stage, S202, it is determined whether or not the specified reading mode is "Normal". If it is determined to be "Normal", the process proceeds to S202. If not, i.e. "Fast, the process proceeds to S221.

The following settings are done in S203 for the 300 dpi (Normal) mode. "OS1" in the selection channel setting register 62, "2:1" in the RS cycle setting register 61, "2:1" in the data transfer cycle setting register 63, "Normal" and "300" in the motor operation setting register 64 are set. After the settings are done, the process goes back to the main routine.

The dynamic range DR calculated in S104 is compared with the rated value to the dynamic range in S211. If the rated value is smaller than DR, the process proceeds to S212. If the rated value is bigger than DR, the process proceeds to S203.

The following settings are done in S212 for the 300 dpi (Fast) mode. "OS2" in the channel setting register, "1:1" in the RS cycle setting register 61, "1:1" in the data transfer cycle setting register 63, "Fast" and "300" in the motor operation setting register 64 are set. After the settings are done, the process goes back to the main routine.

It is determined, in S221, whether or not the specified reading mode is 600 dpi. If it is determined to be 600 dpi, the process proceeds to S221. If not, i.e. 1200 dpi, the process proceeds to S231.

In S222, "OS2" and "OS3" in the channel setting register, "1:1" in the RS cycle setting register 61, "1:2" in the data transfer cycle setting register 63, "Fast" and "600" in the motor operation setting register 64 are set. After the settings are done, the process goes back to the main routine.

In S231, "OS1", "OS2" and "OS3" in the channel setting register, "1:1" in the RS cycle setting register 61, "1:3" in the data transfer cycle setting register 63, "Normal" and "1200" in the motor operation setting register 64 are set. After the settings are done, the process goes back to the main routine.

As described above, the scanner 1 of the present embodiment comprises, in the CCD sensor 20, the first and second sensors 21 and 22, the first shift register 25 which outputs all the pixel signals received from light receiving elements of the first sensor 21, the second shift register 26 which outputs pixel signals received from even numbered light receiving elements of the second sensor 22, and the third shift register 27 which outputs pixel signals received from odd numbered light receiving elements of the second sensor 22. By setting values in the RS cycle setting register 61, the selection channel setting register 62, the data transfer cycle setting register 63 and the motor operation setting register 64 for every reading mode, and by setting operations in the AFE 75 and the image reading control unit 50, it is possible to reduce the number of pixel signals to output after adding pixel signals from light receiving elements in the first shift register. It is capable of image reading operations by selecting a mode from the 300 dpi (Normal) mode wherein pixel data with 300 dpi resolution are output, the 300 dpi (Fast) mode wherein output with 300 dpi resolution is obtained by outputting pixel signals of even numbered light receiving elements from the second shift register, the 600 dpi mode wherein pixel signals of second sensor 22 are fully utilized, and the 1200 dpi mode wherein pixel signals of the first and second sensors 21 and 22 are utilized.

The 300 dpi (Normal) mode executes addition of pixel signals by changing the frequency of the reset signals and that of the reading timing. This mode obtains addition of pixel signals without adding extra parts for this purpose.

Specifically, in the 300 dpi (Normal) mode, the number of pixel signals which contain information on all the numbers of pixel signals received from light receiving elements is reduced half. More information, in other words, is contained in one pixel signal. It improves sensitivity and ability to preserve thin line image. In contrast to the 300 dpi (Fast) mode wherein only half of the light receiving elements are utilized at the same resolution, in case transfer clock signals with the same cycles are used, the 300 dpi (Normal) mode is characterized in taking two times longer to transfer pixel signals because all the light receiving elements are utilized.

In the 300 dpi (Fast) mode, on the other hand, pixel signals of only half the number of light receiving elements are utilized. The time for outputting pixel signals takes about half of the time in the 300 dpi (Normal) mode. Though it takes shorter, in this mode, for image reading, sensitivity and the ability to preserve thin line image decrease because pixel signal information received from light receiving elements is culled.

According to the image reading apparatus of the present embodiment, the setting for the 300 dpi (Fast) mode is automatically switched to 300 dpi (Normal) mode when the brightness of the light source goes down and the value of dynamic range DR calculated in S104 becomes small. In this way, sensitivity is improved by pixel addition and loss of image information is prevented; problems caused by loss or breakage of image information scarcely occur in the 300 dpi (Normal) mode.

In both the 300 dpi (Fast) and 600 dpi modes, reading pixel signals from the CCD sensor is executed fast. Corresponding to this, the time for reading an entire image shortens by changing the speed of sub scanning.

The present invention is not limited to the present embodiment described above but can be carried out in various conformations.

When 600 dpi is specified for the reading resolution, as well as when 300 dpi (less or equal to half in the pixel density of the reading element) is specified, pixel signals from the first shift register 25 can be output by selecting the output terminal OS1 with the selector 76. In that case, the speed for transferring electric charges dose not change. The speed may be lower, in some degree, than when transferring the electric charges with one of the second and third shift register by selecting one of the output terminals OS2 and OS3. However, it can be less influenced by problems, such as noises, corresponding to switching over channels since it's not necessary to switch over channels.

An application to a scanner is explained in the embodiment. The present invention, however, can also be applied to faxes, copiers, and complex machines of these.

In the present embodiment, pixel signal addition is executed by changing the cycle of reset signals with the first shift register, in case of reading image data with the 300 dpi (Normal) mode. The addition, instead, can be done, for example, by adding an addition circuit for digital bit between the data sampling block 54 and the memory interface block 55, and adding pixel data for every two pixels. This method is advantageous in case of using a sensor wherein addition is not effective, instead of using the CCD sensor 20.

What is claimed is:

1. An image reading apparatus which reads images of original copies comprising:
    a first sensor including several light receiving elements arranged in a main scanning direction,
    a second sensor including several light receiving elements arranged in a main scanning direction with predetermined distance away from said first sensor in a sub scanning direction,
    a first output unit which outputs pixel signals received from each light receiving element of said first sensor in the arrangement order of the light receiving elements,
    a second output unit which outputs pixel signals received from even-numbered light receiving elements of the light receiving elements constituting said second sensor in the arrangement order of the light receiving elements,
    a third output unit which outputs pixel signals received from odd-numbered light receiving elements of the light receiving elements constituting said second sensor in the arrangement order of the light receiving elements,
    a first reading unit which adds up pixel signals sequentially output from said first output unit to be consecutive pixel units, and outputs the added pixel signals,
    a second reading unit which outputs the pixel signals sequentially output from one of said second and third output unit as pixel signals, and
    a mode selecting unit which operates said first reading unit when a command for a quality oriented reading mode is externally provided for an operation mode of the image reading apparatus, and operates said second reading unit when a command for a speed oriented reading mode is provided.

2. The image reading apparatus as set forth in claim 1, wherein said first output unit is designed to synchronize a transfer clock externally input, to transfer pixel signals received from each light receiving element of said first sensor to an adding unit in the arrangement order of the light receiving elements, to output pixel signals added by the adding unit, and to eliminate pixel signals added by said adding unit when reset signals are externally input in synchronization with said transfer clock,
    wherein said first reading unit outputs pixel signals added to be consecutive pixel units from said first output unit by setting the cycle length of reset signals input into said first output unit at an integral multiple of the cycle length of said transfer clock, and outputs pixel signals output from the first output unit.

3. The image reading apparatus as set forth in claim 1, further comprising:

a standard image for brightness determination set at a position where said each sensor can read images, and a standard image reading unit which acquires pixel signals obtained by reading said standard image by using any of said first, second and third output units wherein said mode selecting unit is designed so that said mode selecting unit compares a standard value for brightness determination with evaluation value acquired from calculations based on pixel signals read by said standard image reading unit, and said mode selecting unit operates said first reading unit when said evaluation value indicates that it is darker than the state indicated by the standard value.

4. The image reading apparatus as set forth in claim 1, further comprising a sub scanning unit which changes the relative position of said each sensor and an original copy into a sub scanning direction at a travel speed externally set, wherein said mode selecting unit sets the travel speed of said relative position changed by said sub scanning unit depending on duration for outputting the amount of pixel signals of one main-scanning movement from one reading unit corresponding to an operation mode of the image reading apparatus.

5. The image reading apparatus as set forth in claim 1, wherein the pixel density of the first sensor in the main scanning direction and the pixel density of the second sensor in the main scanning direction are the same.

6. The image reading apparatus as set forth in claim 5, further comprising a third reading unit which outputs pixel signals output from one of said first output unit and a group of said second and third output units as pixel data, wherein said mode selecting unit operates said third reading unit when a command for fine reading mode is externally sent for an operation mode of the image reading apparatus.

7. The image reading apparatus as set forth in claim 5, wherein said second sensor is arranged so that the position of each light receiving element consisting the second sensor along with the main scanning direction can be set between light receiving elements consisting the first sensor, the image reading apparatus further comprising a fourth reading unit which outputs pixel signals sequentially output from said first, second and third output units as pixel signals, wherein said mode selecting unit operates said fourth reading unit when a command for super fine reading mode is externally provided for an operation mode of the image reading apparatus.

8. The image reading apparatus as set forth in claim 5, further comprising:

a fifth reading unit outputs pixel signals sequentially output from the first output unit as pixel signals, and a sixth reading unit outputs pixel signals sequentially output from the second and third output unit as pixel signals, wherein the mode selection unit selectively operates one of the fifth and sixth reading units when the reading resolution specified by an external command is equivalent to the pixel density of the first and second sensor.

9. An image reading apparatus which reads images of original copies comprising:

a first sensor including several light receiving elements arranged in a main scanning direction, a second sensor including several light receiving elements arranged in a main scanning direction with predetermined distance away from said first sensor in a sub scanning direction, and its position which is along the main scanning direction of each light receiving element being shifted relative to each light receiving element constituting said first sensor, a first output unit which outputs pixel signals received from each light receiving element of said first sensor in the arrangement order of the light receiving elements, a second output unit which outputs pixel signals received from even-numbered light receiving elements of the light receiving elements constituting said second sensor in the arrangement order of the light receiving elements, a third output unit which outputs pixel signals received from odd-numbered light receiving elements of the light receiving elements constituting said second sensor in the arrangement order of the light receiving elements, a first reading unit which adds up pixel signals sequentially output from said first output unit to be consecutive pixel units, and outputs the added pixel signals, a second reading unit which outputs the pixel signals sequentially output from one of said second and third output unit as pixel signals, and a third reading unit which outputs the pixel signals output from one of said first output unit and a group of said second and third output units as pixel data, a fourth reading unit which outputs pixel signals sequentially output from said first, second and third output units as pixel signals, and a mode selecting unit which operates said first reading unit when a command for a quality oriented reading mode is externally provided for an operation mode of the image reading apparatus, operates said second reading unit when a command for a speed oriented reading mode is provided, operates said third reading unit when a command for a fine reading mode is externally provided for an operation mode of the image reading apparatus, and operates said fourth reading unit when a command for a super-fine reading mode is externally provided for and operation mode of the image reading apparatus.

10. The image reading apparatus as set forth in claim 9, wherein said first output unit is designed to synchronize a transfer clock externally input, to transfer pixel signals received from each light receiving element of said first sensor to an adding unit in the arrangement order of the light receiving elements, to output pixel signals added by the adding unit, and to eliminate pixel signals added by said adding unit when reset signals are externally input in synchronization with said transfer clock, wherein said first reading unit outputs pixel signals added to be consecutive pixel units from said first output unit by setting the cycle length of reset signals input into said first output unit at an integral multiple of the cycle length of said transfer clock, and outputs pixel signals output from the first output unit.

11. The image reading apparatus as set forth in claim 9, further comprising:

a standard image for brightness determination set at a position where said each sensor can read images, and a standard image reading unit which acquires pixel signals obtained by reading said standard image by using any of said first, second and third output units wherein said mode selecting unit is designed so that said mode selecting unit compares a standard value for brightness determination with evaluation value acquired from calculations based on pixel signals read by said standard image reading unit, and said mode selecting unit operates said first reading unit when said evaluation value indicates that it is darker than the state indicated by the standard value.

12. The image reading apparatus as set forth in claim 11, further comprising a sub scanning unit which changes the relative position of said each sensor and an original copy into a sub scanning direction at a travel speed externally set,
wherein said mode selecting unit sets the travel speed of said relative position changed by said sub scanning unit depending on duration for outputting the amount of pixel signals of one main-scanning movement from one reading unit corresponding to an operation mode of the image reading apparatus.

13. The image reading apparatus as set forth in claim 9, wherein the pixel density of the first sensor in the main scanning direction and the pixel density of the second sensor in the main scanning direction are the same.

14. The image reading apparatus as set forth in claim 13, further comprising:
- a fifth reading unit outputs pixel signals sequentially output from the first output unit as pixel signals, and
- a sixth reading unit outputs pixel signals sequentially output from the second and third output unit as pixel signals, wherein the mode selection unit selectively operates one of the fifth and sixth reading units when the reading resolution specified by an external command is equivalent to the pixel density of the first and second sensor.

* * * * *